Patented Aug. 15, 1944

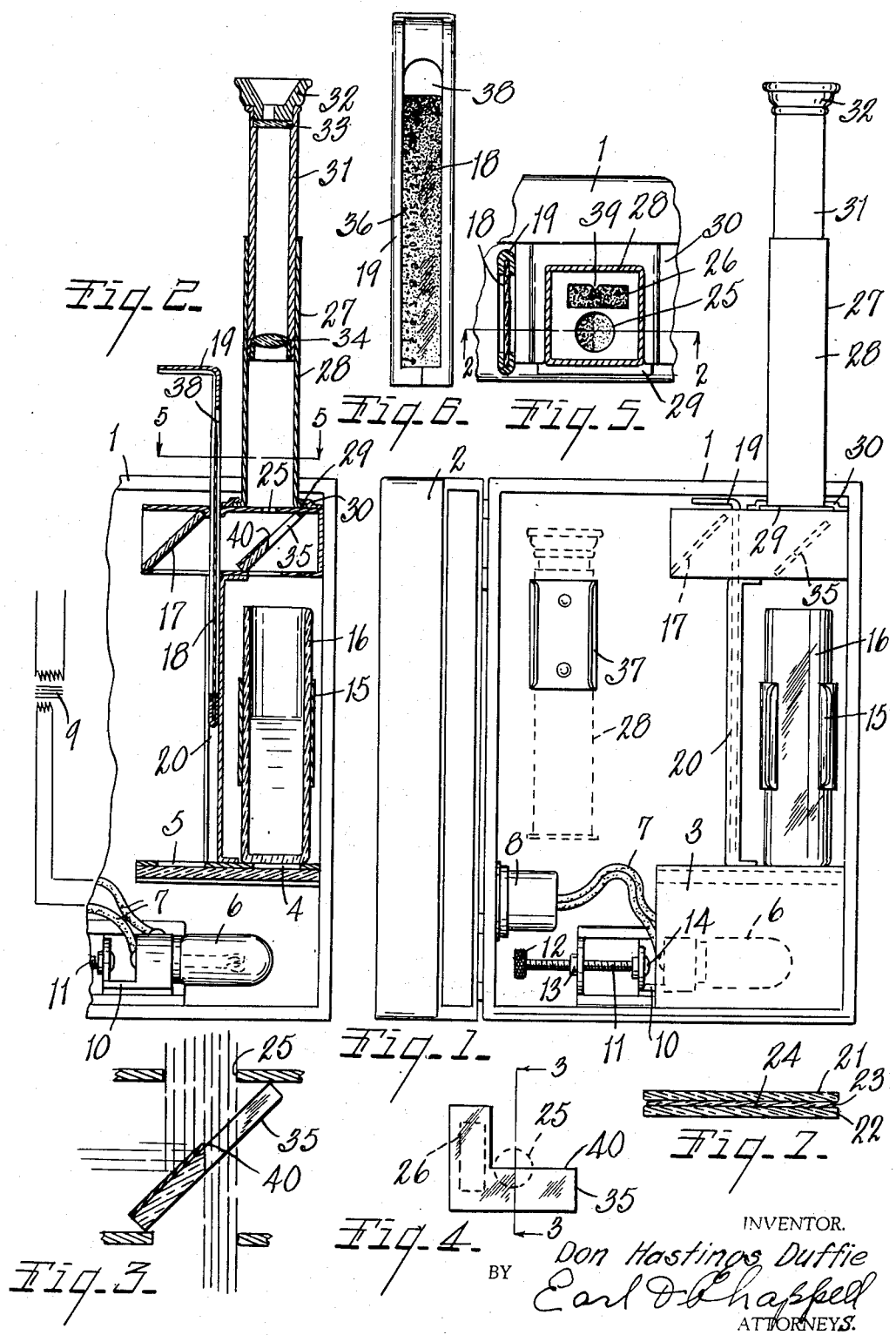

2,355,960

UNITED STATES PATENT OFFICE 2,355,960

HEMOGLOBINOMETER

Don Hastings Duffie, Central Lake, Mich.

Application October 10, 1940, Serial No. 360,524

6 Claims. (Cl. 88—14)

This invention relates to improvements in hemoglobinometers.

This invention relates to hemoglobinometers and has for its objects;

First, to provide a new and improved hemoglobinometer.

Second, to provide such a hemoglobinometer which is simple and compact and can be made inexpensively.

Third, to provide such a hemoglobinometer which is extremely accurate and not liable to errors of calibration commonly encountered in certain of the electric hemoglobinometers now commonly in use.

Fourth, to provide such a hemoglobinometer in which the necessity for matching colors is eliminated and in which by means of filters light which is passed through the blood and light from a source for comparison are reduced to a common color so that intensities or luminosities can be compared for determining the blood content of hemoglobin or other colored substance.

Fifth, to provide such a hemoglobinometer in which a scale showing the intensity of the light from the source for comparison is visible through the eye-piece which is used in making the comparison of luminosity or intensity of the light from the source for comparison and from the blood.

Further objects and advantages pertaining to details and economies of construction and operation will appear from the description to follow. The invention is defined in the claims. A preferred embodiment of my invention is illustrated in the accompanying drawing, in which:

Fig. 1 is a side view in elevation of my improved instrument.

Fig. 2 is a partial view similar to Fig. 1 taken on line 2—2 of Fig. 5, showing the optical wedge moved to a typical position for comparison with the blood.

Fig. 3 is a detail enlarged view taken on line 3—3 of Fig. 4, showing the mirror arrangement for directing the light to the field of a lens for viewing after the light has passed through the optical wedge and through the blood.

Fig. 4 is a top plan view of the mirror used to direct the aforesaid light to the field of the lens.

Fig. 5 is a view taken on line 5—5 of Fig. 2.

Fig. 6 is a view of the optical wedge used in my apparatus.

Fig. 7 is a view of a modified type of optical wedge which may be employed.

My improved instrument is housed in a pocket size case 1 having a hinged cover 2. In the lower portion of the case is a lamp housing 3 having two apertures 4 and 5 at the top thereof over the light 6 which is connected by wires 7 to a plug 8 to receive line current.

I prefer to use a 6-volt flashlight bulb so that the apparatus can, if necessary, be connected to an automobile battery, although a suitable transformer 9 may be employed as indicated diagrammatically in Fig. 2. The lamp 6 is mounted on a slide 10 for lateral movement and a screw 11 with a knurled head 12 threaded in a stationary nut 13 and pivotally fastened at 14 to the slide 10 is employed for making lateral adjustment and for holding the light bulb in adjusted position.

Directly above the aperture 4, I provide a suitable spring clamp 15 to receive a vial 16 for receiving the blood to be examined. Directly above the aperture 5 I provide a surface silvered mirror 17 disposed at 45 degree angle with its silvered reflecting surface toward the aperture 5 and adapted to direct light from the aperture 5 through an optical wedge 18 which is mounted in a suitable slide 19 which is slidable in ways 20 extending vertically from the light housing 3.

I prefer to use as the optical wedge a piece of exposed and developed photographic film of a gray tint for the purpose of transmitting white light or light waves of all visible wave lengths or of any tint which appears neutral when viewed through the filter 33 which will be later described or, in other words, a photographic film of any tint which appears of the same color as that transmitted by the filter 33, when said film 18 is viewed through said filter 33, the film 18 then appearing neutral when viewed through said filter 33. If the photographic film 18 is of gray tint, as above described, regardless of the particular wave lengths transmitted by the filter 33, the film 18 will always appear of the same color as the filter 33 when viewed through the filter, that is, the film 18 will appear neutral when viewed through the filter 33. The density range which I have found suitable is from about .24 to .9 when approximately 20 cu. mm. of blood are viewed in an ordinary Kahn vial approximately 11 mm. in diameter.

It is possible to make use of a wedge such as shown in Fig. 7 consisting of two pieces of glass 21 and 22 slightly separated at one end as shown at 23 with pigmented gelatine 24 therebetween.

I prefer to use the photographically produced wedge which can be made either by printing film through a standard wedge such as is shown in Fig. 7 and developing to the required gamma, or by impinging geometrically increasing exposures by a log. curve aperture in a sector disk on the film. Directly above the aperture 4 and the vial 16, I provide a pair of apertures 25 and 26 and directly above them a telescoping tower 27 consisting of a female member 28 having bottom flanges 29 adapted to fit under retaining slides 30 to permit easy removal and a male member 31 slidable in the female member 28 and having an eye-piece 32 with a filter 33 and carrying a lens 34.

I prefer to use a green filter, although any filter which is opaque to red light or to certain visible wavelengths of light transmitted by the solution being examined is satisfactory. The green filter is particularly desirable, however, because it may be used for determining sulfapyradine or sulfanilimide concentration in the body fluids since it serves as an opaque filter to the colors characteristic of these tests. I find it satisfactory to employ a lens having a 78 mm. focal length which gives the necessary magnification for accurate clinical work together with sufficient depth of focus.

By spacing the eye-piece 32 from the lens 34, I increase the accuracy of the instrument very materially because the eye-piece serves as a rear sight for directing the view of one using the apparatus to the identical place for each use of the apparatus.

Directly below the tower and within the field of the lens and the eye-piece, I dispose an L-shaped surface silvered mirror 35 at a 45 degree angle with its silvered or reflecting surface directed upwardly. The mirror is so arranged that it will reflect light reflected by the mirror 17 through the apertures 25 and 26 but does not completely cover the aperture 25 permitting the light through aperture 4 and the vial 16 to pass through half of the aperture 25.

I provide the aperture 26 for viewing the reflected image of the scale 36 which is preferably printed on the optical wedge 18.

In the preferred form of my construction, I provide within the case 1 a spring clip 37 to hold the tower 27 when it is telescoped as indicated in dotted lines in Fig. 1.

In using my invention, I place the blood of unknown characteristics in the vial 16 using the ordinary technique for treating the blood. The usual procedure is to dilute 20 cu. mm. of blood with about 3 cc. of .1% solution of sodium carbonate to liberate the red color from the corpuscles.

Before making a reading, it is desirable to obtain a zero setting and this is done by preferably removing the vial 16 and adjusting the position of the light bulb 6 laterally until the light reflected through the aperture 25 from the mirror 35 and the light passing from the aperture 4 through the aperture 25 have the same intensity. This zero setting is obtained either by moving the wedge 18 to the bottom as viewed in Fig. 1 so that the light from the mirror 17 may pass through the aperture 38 or by completely removing the wedge.

After the zero setting, the vial 16 with the blood therein is placed in the clip 15 and the optical wedge is moved vertically until the intensity or luminosity of the light reflected by the mirror 35 through the aperture 25 is the same as the intensity or luminosity of the light passing through the blood and through the aperture 25. When the optical wedge has been adjusted to the position to obtain this match, the pointer 39 will be opposite the reflected portion of the scale 36 in aperture 26 and the reading will give the hemoglobin content of the blood.

While carrying on this operation, I focus the lens 34 substantially on the edge 40 of the mirror 35.

In order to keep the dividing edge 40 of the mirror 35 and the indicia of the optical wedge in good focus, I position the optical wedge as close to the mirror 35 as is practical and I position the telescopic tower and the aperture of the eye-piece thereof as close to the plane of the optical wedge as possible.

In Fig. 5, I show the appearance of the apertures 25 and 26 during the use of the apparatus. It will be noted that in the aperture 25, the right half is shown as lighter than the left half. This would be a situation encountered and would require the raising of the optical wedge so that a lighter portion would be interposed between the mirrors 17 and 35. When a perfect match is obtained, the entire aperture 25 would appear to be illuminated by the same light, since the intensities of the light reflected by the mirror 35 and the light passing through the blood 16 would be the same.

Heretofore attempts have been made to provide hemoglobinometers in which a known color standard is employed. A standard solution, however, may not retain the desired characteristics because it may fade. There is a further disadvantage in that it is quite difficult to obtain an exact color match. If a glass standard is used, a similar undesirable apparatus is obtained because of the difficulty of attempting to match the color of the glass to the color of blood. If the colors of the standard, whether a fluid or glass, are not identical, considerable difficulty is encountered in matching. One of the compound colors going to make up the standard may appear brighter than the similar color in the unknown and there may be a color in the unknown which appears brighter than the color on the standard. This makes it extremely difficult to obtain accuracy. I have found that if I eliminate the color of the blood by using a filter which is opaque to red and thereby turn all of the colors to the standard color of the filter, I can obtain accurate results observing the luminosity or intensity, because of the elimination of the undesirable factors above referred to.

The terms and expressions which have been herein employed are used as terms of description and not of limitation, and there is no intention in the use of such terms and expressions of excluding any equivalents of the features shown and described. It is recognized that various modifications are possible within the scope of the invention claimed.

Having thus described my invention, what I claim as new and desire to secure by Letters Patent is:

1. In a hemoglobinometer or the like, the combination of a telescopic tower having a movable member carrying an eye-piece and a lens spaced apart, a transparent blood container in line with said lens and eye-piece, a mirror disposed in the field of said eye-piece and between said container and said eye-piece and at an angle with its reflecting surface directed generally toward said eye-piece without completely obstructing the passage of light from container to eye-piece, a light housing having a pair of apertures one in line with said container, lens and eye-piece, a lamp in said housing and having means for adjusting it back and forth along a line parallel with the line of said apertures to control and balance the illumination thereof, a second mirror in line with said second aperture of said housing and positioned to reflect light therefrom to said first mentioned mirror, and an optical wedge slidably mounted for adjustment across the line of light from said second aperture to said first mirror, whereby the intensity of the light reflected to the eye-piece by the first mentioned mirror may be varied, said wedge having indicia thereon corresponding to the density of the wedge and in the line of light between said second aperture and said first mirror whereby said indicia may be viewed through said eye-piece, and filter means opaque to red disposed in the lines of light to said eye-piece, said wedge being of a color which appears neutral when viewed through said filter means.

2. In a hemoglobinometer or the like, the combination of an eye-piece and a lens spaced apart, a transparent blood container in line with said lens and eye-piece, a mirror disposed in the field of said eye-piece and between said container and said eye-piece and at an angle with its reflecting surface directed generally toward said eye-piece without completely obstructing the passage of light from container to eye-piece, a light housing having a pair of apertures one in line with said container, lens and eye-piece, a lamp in said housing and having means for adjusting it back and forth along a line parallel with the line of said apertures to control and balance the illumination thereof, a second mirror in line with said second aperture of said housing and positioned to reflect light therefrom to said first mentioned mirror, and an optical wedge slidably mounted for adjustment across the line of light from said second aperture to said first mirror whereby the intensity of the light reflected to the eye-piece by the first mentioned mirror may be varied, said wedge having indicia thereon corresponding to the density of the wedge and in the line of light between said second aperture and said first mirror whereby said indicia may be viewed through said eye-piece, and filter means opaque to red disposed in the lines of light to said eye-piece, said wedge being of a color which appears neutral when viewed through said filter means.

3. In a hemiglobinometer or the like, the combination of an eye-piece and a lens spaced apart, a transparent blood container in line with said lens and eye-piece, a mirror disposed in the field of said eye-piece and between said container and said eye-piece and at an angle with its reflecting surface directed generally toward said eye-piece without completely obstructing the passage of light from container to eye-piece, a light housing having a pair of apertures one in line with said container, lens and eye-piece, a lamp in said housing, a second mirror in line with said second aperture of said housing and positioned to reflect light therefrom to said first mentioned mirror, and an optical wedge slidably mounted for adjustment across the line of light from said second aperture to said first mirror whereby the intensity of the light reflected to the eye-piece by the first mentioned mirror may be varied, said wedge having indicia thereon corresponding to the density of the wedge and in the line of light between said second aperture and said first mirror whereby said indicia may be viewed through said eye-piece, and filter means opaque to red disposed in the lines of light to said eye-piece, said wedge being of a color which appears neutral when viewed through said filter means.

4. In a hemoglobinometer or the like, the combination of an eye-piece, a transparent blood container in line with said eye-piece, a mirror disposed in the field of said eye-piece and between said container and said eye-piece and at an angle with its reflecting surface directed generally toward said eye-piece without completely obstructing the passage of light from container to eye-piece, a light housing having a pair of apertures one in line with said container, and eye-piece, a lamp in said housing, a second mirror in line with said second aperture of said housing and positioned to reflect light therefrom to said first mentioned mirror, and an optical wedge slidably mounted for adjustment across the line of light from said second aperture to said first mirror whereby the intensity of the light reflected to the eye-piece by the first mentioned mirror may be varied, said wedge having indicia thereon corresponding to the density of the wedge and in the line of light between said second aperture and said first mirror whereby said indicia may be viewed through said eye-piece, and filter means opaque to red disposed in the lines of light to said eye-piece, said wedge being of a color which appears neutral when viewed through said filter means.

5. In a hemoglobinometer or the like, the combination of an eye-piece, a transparent blood container in line with said eye-piece, a mirror disposed in the field of said eye-piece and between said container and said eye-piece and at an angle with its reflecting surface directed generally toward said eye-piece without completely obstructing the passage of light from container to eye-piece, a light housing having a pair of apertures one in line with said container and eye-piece, a lamp in said housing, a second mirror in line with said second aperture of said housing and positioned to reflect light therefrom to said first mentioned mirror, and an optical wedge slidably mounted for adjustment across the line of light from said second aperture to said first mirror whereby the intensity of the light reflected to the eye-piece by the first mentioned mirror may be varied, and filter means opaque to red disposed in the lines of light to said eye-piece, said wedge being of a color which appears neutral when viewed through said filter means.

6. In a hemoglobinometer or the like, the combination of an eye-piece, a transparent blood container in line with said eye-piece, a mirror disposed in the field of said eye-piece and between said container and said eye-piece and at an angle with its reflecting surface directed generally toward said eye-piece without completely obstructing the passage of light from container to eye-piece, a light housing having a pair of apertures one in line with said container, and eye-piece, a lamp in said housing, a second mirror in line with said second aperture of said housing and positioned to reflect light therefrom to said first mentioned mirror, and an optical wedge slidably mounted for adjustment across the line of light from said second aperture to said first mirror whereby the intensity of the light reflected to the eye-piece by the first mentioned mirror may be varied, and green filter means in the lines of light to said eye-piece, said wedge being of a color which appears neutral when viewed through said filter means.

DON HASTINGS DUFFIE.